INVENTORS
HAAREN A. MIKLOFSKY
HAROLD S. HORIUCHI

BY [signature] Walter S. Paul
ATTORNEYS

AUTOMATIC DIP SOLDERING AND DIP TINNING MACHINE

Filed Oct. 22, 1953 3 Sheets-Sheet 2

INVENTORS
HAAREN A. MIKLOFSKY
HAROLD S. HORIUCHI

BY Walter S. Paul
ATTORNEYS

Jan. 8, 1957 H. A. MIKLOFSKY ET AL 2,776,640

AUTOMATIC DIP SOLDERING AND DIP TINNING MACHINE

Filed Oct. 22, 1953 3 Sheets-Sheet 3

INVENTORS
HAAREN A. MIKLOFSKY
HAROLD S. HORIUCHI

BY Walter S. Paul.
ATTORNEYS 2,776,640

AUTOMATIC DIP SOLDERING AND DIP TINNING MACHINE

Haaren A. Miklofsky and Harold S. Horiuchi, Hyattsville, Md., assignors to the United States of America as represented by the Secretary of the Navy Application October 22, 1953, Serial No. 387,814

5 Claims. (Cl. 118—74)

Figure 1:
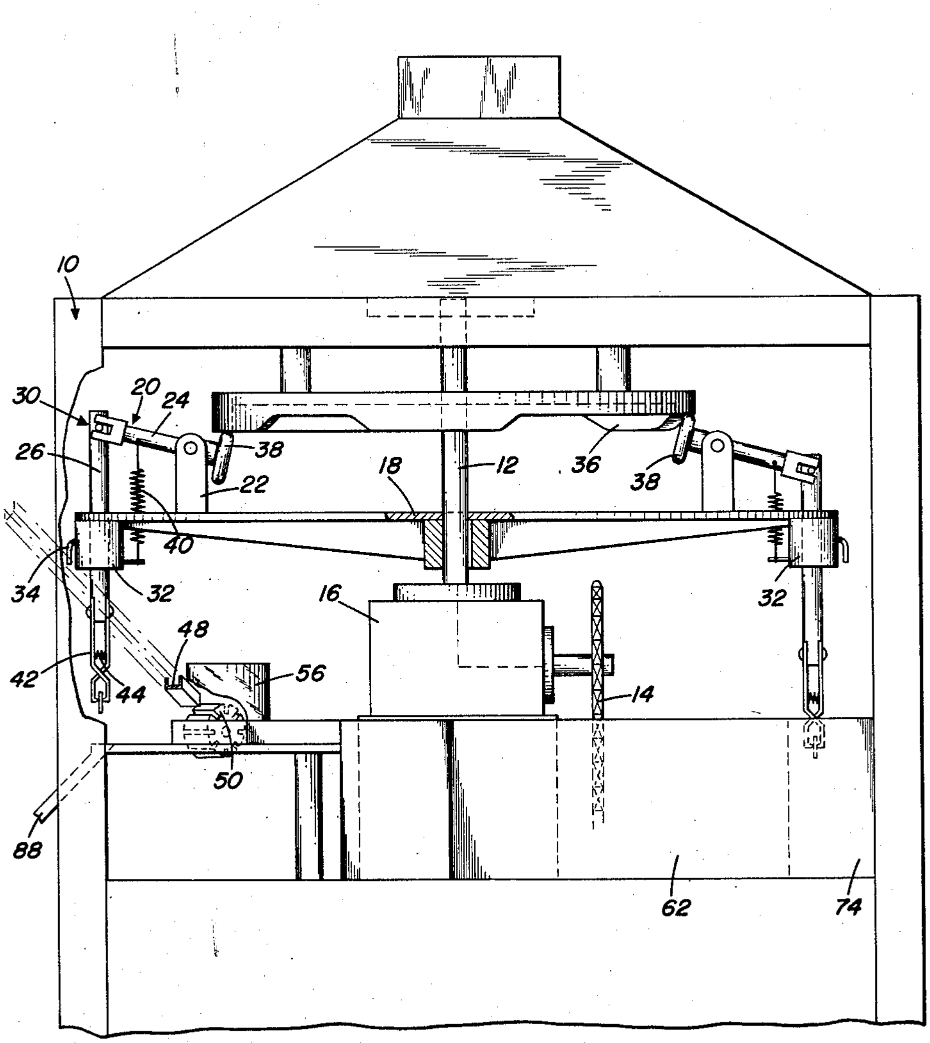

(Granted under Title 35, U. S. Code (1952), sec. 266)

This invention relates to improvements in machines and present methods of dip tinning objects, particularly small, frangible objects that require careful handling.

In copending applications 324,160 filed Dec. 4, 1952 and 318,148 filed Oct. 31, 1952 by Robert L. Henry, an electronic module and methods of making it are described. As a procedural step in the method, small ceramic wafers are said to be tinned to facilitate subsequent soldering. Dip tinning may be done by simply holding a component by a pair of pliers and submerging it into hot, fluent solder, and then withdrawing the then tinned object. A purpose of the present invention is to provide a method and mechanical apparatus for dip tinning frangible objects such as the wafers W described in the copending applications of Henry, rapidly and with little or no breakage.

Another and more explicit object of the invention is to provide a series of containers having flux, solder and washing liquid, above which rotates a platform on which a plurality of object holding clamps are reciprocatively mounted whereby the objects held by the clamps may be submerged in successive containers to tin the objects.

A further object of the invention is to provide air stream conducting means directed on the objects to blow excess material from the objects, that is accumulated from each of the containers, the air streams being active only during the period of time that there is an object requiring the air blast disposed in the air stream path of travel.

Other objects and features will become apparent in following the description of the invention.

Figure 2:
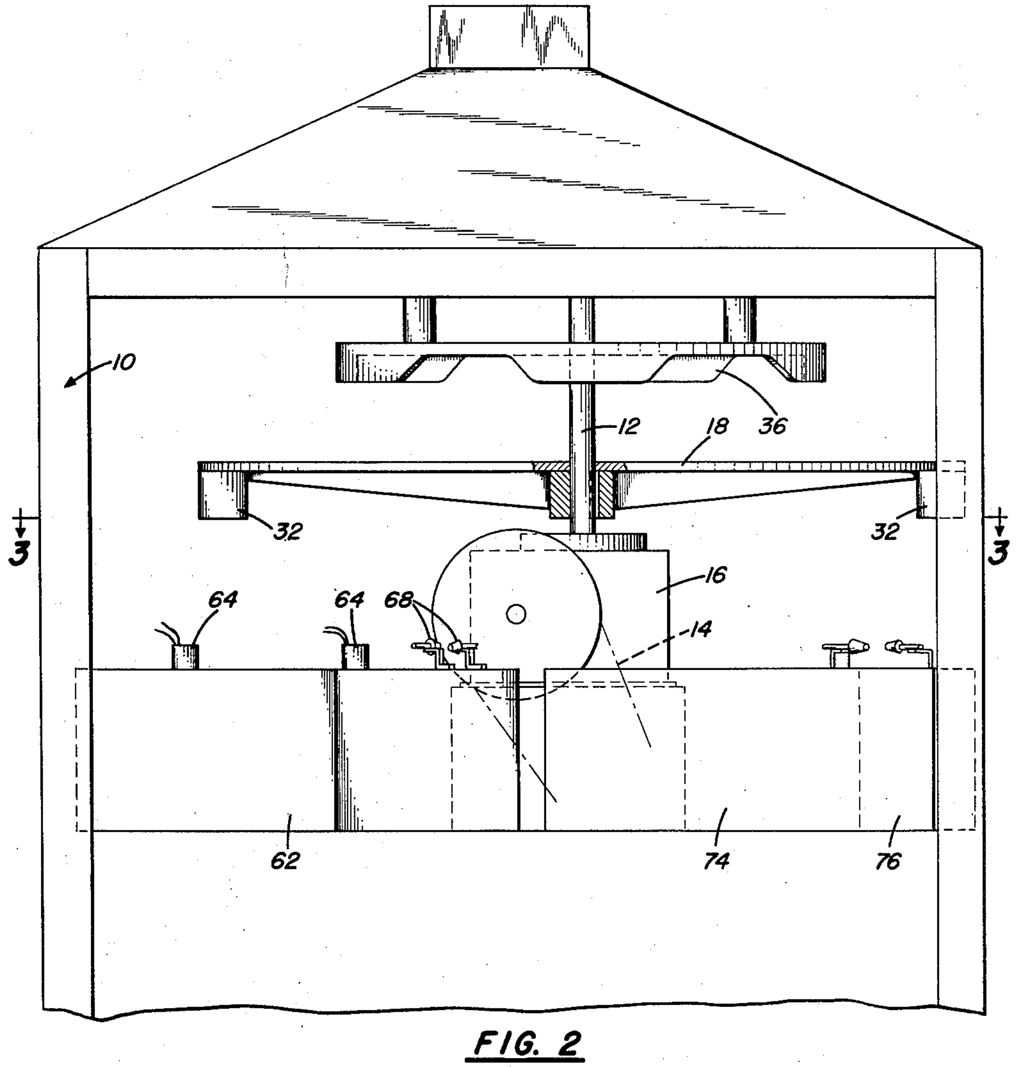
Figure 3:
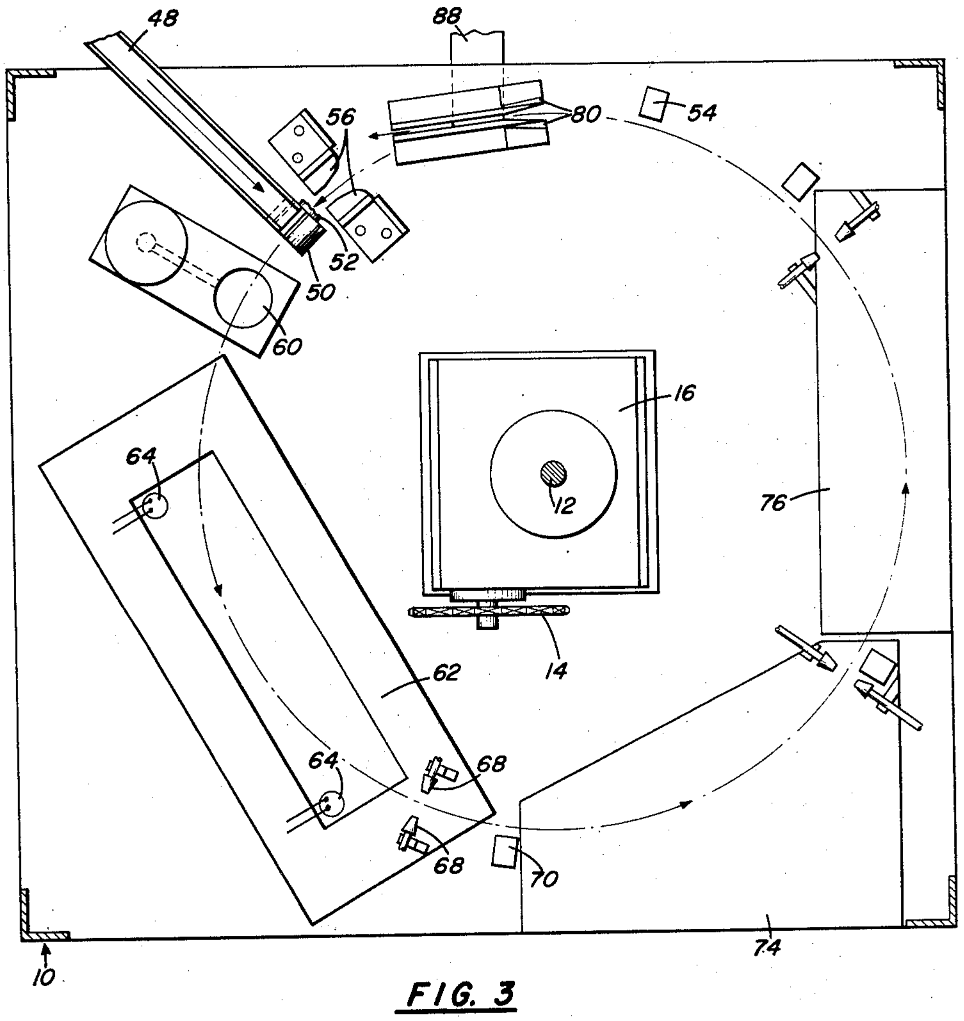

In the drawings:

Fig. 1 is an elevational view of the dip tinning apparatus, parts being shown in section, and details of the drive and air system being omitted, Fig. 2 is an elevational view similar to that of Fig. 1 but taken from a position ninety degrees rotated, and additional parts being omitted for clarity, and Fig. 3 is sectional view taken substantially along the line 3—3 of Fig. 2 and in the direction of the arrows.

As pointed out in the previously mentioned applications, there is use for a small ceramic part on which electronic components are formed or carried. In preparing the ceramic parts, they are coated in a desired pattern by a metal particle bearing paint, the pattern being determined by the purpose for which the part is intended. For example, capacitors have been developed which consist of a disc having a conductive coating on each side of it. To fasten a capacitor such as this to a flat ceramic wafer, the wafer would first have a metal circle painted on it, and that circle would have to be tinned to assure that the capacitor disc would adhere to the wafer. The invention deals with methods of and means for dip tinning not only the patterns on such wafers, but also the capacitor discs, other electronic components, wafers with other patterns on them, and any other object that can be handled manually.

A support 10 is provided of the necessary structural strength and form to accommodate and house the mechanism of the illustrated embodiment of the invention. The support 10 has a rotor including a vertical shaft 12 mounted for rotation thereon, shaft 12 being driven by a motor through a chain 14 and transfer mechanism 16. A platform 18 is keyed or otherwise fixed to shaft 12 for rotation therewith, the platform preferably being located in a horizontal plane. There are object handling units 20 spaced around the periphery of platform 18, the actual number of units being a design factor. Each unit consists of a bracket 22 fixed to the platform, a rocker 24 pivoted to it, and a reciprocatory rod 26 connected by slot and pin assembly 30 to rocker 24. Rod 26 is mounted in a bearing 32 carried by platform 18, and it has a set screw 34 arranged to engage rod 26 for holding the rod temporarily in a selected position as for repair, inspection and the like.

As the platform 18 is rotated, rods 26 are reciprocated, and the means for causing this to happen consist of a cam 36 fixed to support 10, together with cam followers 38 on the inner ends of rockers 24. Springs 40 connected to rockers 24 and bearings 32 of each unit 20 constantly bias the followers 38 against cam 36, assuring that each unit will behave as required by the shape of cam 36. At the lower end of each rod 26 there is a clamp 42 adapted to grasp and hold an object during the entire tinning cycle of operation. Clamp 42 consists of a pair of resilient fingers, as spring steel or the like, secured at one pair of ends to rod 26 and after being crossed, terminating in object engaging jaws. Spring 44 bearing against confronting surfaces of the fingers maintain the jaws in a normally closed condition.

The objects to be tinned, are fed by suitable means to clamps 42 which pick them up and carry the objects to and through the various stations and stages of the tinning process. Chute 48 is a feed for the slotted wheel 50, the objects being fed one by one into the slots of wheel 50, and the latter being rotated a sufficient amount after receiving an object to present the object vertically to one of the clamps 42. One of a number of electro-mechanical expedients may be used to rotate wheel 50, for example, a rotary solenoid may be energized to actuate a ratchet mechanism 52 connected to wheel 50 whenever one of the bearings 32 passes switch 54, contacting and momentarily closing it. Of course, the switch 54 will be wired to the rotary solenoid, and the latter will drive the ratchet mechanism that actuates the wheel 50 a small, predetermined amount.

Since clamps 42 are normally closed, means are provided to open each clamp long enough to grasp the object in slotted wheel 50 that is presented to the open clamp. The preferable means to serve this function are a pair of spaced cams 56 carried by support 10 and close enough to afford passage between them if the upper parts of the clamp fingers are squeezed together. This opens the jaws of the clamp against the yielding opposition of spring 44. Accordingly, the clamp jaws are opened by cams 56, as platform 18 is rotated, when the clamp is ready to receive one of the objects. When the object is located between the jaws of the clamp, the clamp is moved from between cams 56, whereby spring 44 pulls the jaws of the clamp closed on the object, frictionally holding it.

Following the travel of an object grasped by one of the clamps 42 as platform 18 rotates, it is moved over container 60 and into that container. The object is moved over container 60 by rotation of platform 18, and into container 60 by sliding rod 26 downward, this being accomplished by spring 40 and the shape of cam 36 on which follower 38 rolls as platform 18 rotates, allowing spring 40 to pull rod 26. The object is then withdrawn from container 60 (as platform 18 continues to rotate at a constant speed) by a high spot on cam 36 forcing roller 38 down and through rocker 24, the arm 26 up. Container 60 has a supply of soldering flux in it, the level being held constant by standard means. Then the object is moved along the prescribed path of travel with platform 18 until it reaches container 62 having a supply of solder maintained in the fluent condition by an electric heater. In addition, the temperature is held constant by a switch for the heater, controlled by thermostats 64 in container 62. The shape of cam 38 dictates the time-in-motion that clamps 42 may be lowered by their springs 40, and the cam elevates clamp 42 against the bias of springs 40. Accordingly, as the clamp holding the object under consideration is moved over container 62, it is moved into the container, submerging the object in the solder. Then the clamp with its object is lifted from container 62 and subjected to a cooling air blast which strips the object of excess solder as well as cools. Nozzles 68 connected to a valve controlled air supply are mounted on support 10 at such elevation that the clamp 42 and object pass between them, at which time the air valve (electric) is opened. Such valve opening may be affected by momentary closing of switch 70 mounted in the path of travel of bearings 32, and properly wired to a source and the valve controlling the air supply.

As the object in one of the clamps 42 is moved along with platform 18, it is immersed in a first and a second container 74 and 76 respectively, each containing a washing liquid. After each wash bath there is a blast nozzle assembly identical to the previously described pair of nozzles. The washing liquid is preferably circulated constantly and filtered to remove impurities, conventional circulatory systems being used for this purpose.

Finally, the object is ready to be discharged, the tinning operation having been completed. The clamp is required to surrender its object by passing between cams 80 which are similar in function to cams 56. In support 10 beneath cams 80 there is a discharge chute 88 to conduct the object to a remote destination.

Although for simplicity two clamps 42 and associated mechanism are illustrated, it is understood that more are to be disposed on platform 18 in order to have a satisfactorily high output without excessive platform speed.

As a safety feature, one or both of the thermostats 64 may be arranged to prevent the main drive motor for platform 18 from being energized until the solder in the container 62 becomes fluent.

From the foregoing it is believed that the mechanical operation is apparent. The machine illustrated is one embodiment that will function to practice the subsequently claimed process. However, the steps of the method may be carried out by hand, or by mechanism other than those illustrated. For example, the flux may be sprayed on the object, the solder poured over the object, and the object stripped of excess solder by use of a centrifuge.

Various modifications and deviations may be made without departing from the scope of the following claims.

The invention described herein may be manufactured and used by or for the Government of the United States of America for governmental purposes wihout the payment of any royalties thereon or therefor.

What is claimed is:

1. A machine to dip tin objects, said machine comprising a support, a vertically disposed continuously rotating shaft carried by the support, a horizontal platform fixed to said shaft for rotation therewith, a plurality of normally closed clamps, means mounting said clamps for vertical movement on said horizontal platform, a plurality of containers carried by said support and disposed beneath said clamps, said containers being adapted to hold flux, solder and bath liquid, means on said support for opening the clamps in response to engagement with the clamps, an object feed device arranged to supply an object between the open jaws of one of said clamps while it is open, means including a cam and cam followers for moving said clamps one by one into said containers to bathe the objects in the substance in said containers, and a clamp opening structure carried by said support and arranged to open said clamps to release the objects held thereby.

2. In a dip tinning machine, the combination of a continuously moveable platform, a plurality of clamps movably carried by said platform, a series of containers adapted to retain soldering supplies and washing fluid, said containers being arranged coincident with the path of travel of said movable platform and the clamps, mechanical means operatively connected with said clamps for moving them toward and from successive containers, a loading device for feeding objects to said clamps, means to open each clamp as it approaches said loading device in order to accept one of the objects, and means for opening each clamp after passing said series of containers to release the object carried by each clamp.

3. In an automatic dipping and tinning machine, a support, a vertically disposed shaft rising from said support, means to rotate said shaft, a rotor fixed to said shaft for rotation therewith, a plurality of rocker arms, a rocker arm support on said rotor for each of said rocker arms, each of said rocker arm supports pivotally supporting one of said rocker arms intermediate its length for movement in a vertical plane, said rocker arms extending radially of said rotor, a rod pivotally connected to the outer end of each rocker arm and slidably mounted in said rotor for axial movement in a vertical plane, means yieldingly acting on each of said arms for urging each of said rods downwardly, a clamp carried by the lower end of each rod, spring means urging each clamp to the closed position, circular cam means in juxtaposition with the inner end of each rocker arm to selectively urge said end downward or permit said end to rise under the urging of said acting means, article holding means on said support, means on said support to open each clamp as it approaches said holding means, whereby said clamp will be opened against the urging of its spring means by said opening means and automatically closed upon an article in said holding means, a plurality of baths on said support, said cam being so shaped as to cause each of said rods and clamp to descend and dip an article into each of said baths, and clamp releasing means on said support, each of said clamps being acted on by said releasing means after the last of said baths.

4. In an automatic dipping and tinning machine, a support having a generally horizontal surface, a vertical, continuously rotating shaft rising from said support, a rotor fixed to said shaft and supporting at the periphery thereof a plurality of vertically moveable rods, a radially disposed rocker arm for each rod pivotally supported on said rotor for oscillation in a vertical plane, the outer end of each rocker arm being pivotally connected to the upper end of each of said rods, cam means disposed to be contacted by the inner end of each of said rocker arms to cause said arms to oscillate and said rods to translate axially, normally spring closed clamps carried by the lower end of each of said rods, said clamps being openable by a compressive action, and means on said support engageable with said clamps to compress each in turn as they rotate with said rotor, whereby each of the clamps will be automatically opened to receive an object therein, then will automatically close on the object and then carry the object in a circular undulating path.

5. The apparatus of claim 4, and further clamp opening means on said support to compress and thereby open said clamps and release the objects.

(References on following page)

References Cited in the file of this patent

UNITED STATES PATENTS

| | | |
|---|---|---|
| 527,628 | Thomas | Oct. 16, 1894 |
| 928,172 | Bernardin | July 13, 1909 |
| 1,537,117 | Hurd, 2d. | May 12, 1925 |
| 1,739,482 | Griswold | Dec. 10, 1929 |
| 1,906,400 | Moon | May 2, 1933 |
| 1,953,300 | Holman | Apr. 3, 1934 |
| 2,272,586 | Ross | Feb. 10, 1942 |
| 2,533,048 | Rodgers | Dec. 5, 1950 |
| 2,679,824 | Schmuldt | June 1, 1954 |